United States Patent
Ng (10) Patent No.: US 6,776,481 B2
(45) Date of Patent: Aug. 17, 2004

(54) CLIP ON VISOR

(76) Inventor: Dave Wah Foo Ng, 11 Milford Lane, Untionville, Ontario (CA), L3R 0S1

( * ) Notice: Subject to any disclaimer, the term of this patent is extended or adjusted under 35 U.S.C. 154(b) by 0 days.

(21) Appl. No.: 10/236,984

(22) Filed: Sep. 9, 2002

(65) Prior Publication Data

US 2004/0046928 A1 Mar. 11, 2004

(51) Int. Cl.⁷ ................................................ G02C 9/00
(52) U.S. Cl. ........................................ 351/47; 351/57
(58) Field of Search ............................... 351/47, 57, 48, 351/58, 44, 41

(56) References Cited

U.S. PATENT DOCUMENTS

| | | | |
|---|---|---|---|
| 4,070,103 A | 1/1978 | Meeker | |
| 4,247,178 A | * 1/1981 | Cook | 351/47 |
| 5,416,537 A | 5/1995 | Sadler | |
| 5,428,407 A | 6/1995 | Sheffield | |
| 5,568,207 A | 10/1996 | Chao | |
| 5,614,963 A | * 3/1997 | Parker | 351/47 |
| 5,642,177 A | 6/1997 | Nishioka | |
| 5,737,054 A | 4/1998 | Chao | |
| 5,975,691 A | 11/1999 | Ku | |
| 6,053,611 A | 4/2000 | Ku | |
| 6,264,323 B1 | 7/2001 | Chao | |
| 6,341,864 B1 | 1/2002 | Ng | |
| 6,474,810 B1 | 11/2002 | Ng | |

FOREIGN PATENT DOCUMENTS

| | | |
|---|---|---|
| CA | 21801714 | 5/1997 |
| CA | 2235917 | 7/1998 |
| CA | 2235088 | 10/1998 |
| CA | 2235897 | 11/1998 |
| CA | 2236025 | 4/1999 |
| CA | 2223295 | 7/1999 |
| DE | 43 16 698 | 11/1994 |
| WO | WO 90/09611 | 8/1990 |
| WO | WO 026718 | 5/2000 |

* cited by examiner

Primary Examiner—Hung X. Dang
(74) Attorney, Agent, or Firm—Ridout & Maybee LLP (57) ABSTRACT

A visor is provided having a mechanical fastener for releasably engaging the bridge portion of the primary frames. The visor can extend beyond and around the primary frames. The visor can have a malleable border around the edge of the visor.

20 Claims, 7 Drawing Sheets

CLIP ON VISOR

FIELD OF THE INVENTION

BACKGROUND OF THE INVENTION

The literature teaches numerous methods for attaching auxiliary eyeglasses to primary eyeglasses. Magnetically attached auxiliary eyeglass attachments are disclosed in U.S. Pat. No. 4,070,103 to Meeker U.S. Pat. No. 5,416,537 to Sadler, U.S. Pat. No. 5,737,054 to Chao, U.S. Pat. No. 5,975,691 to Ku, Canadian patent application No. 2,180,714 to Chao, Canadian patent application No. 2,235,897 to Chao, Canadian patent application No. 2,236,025 to Ku, Canadian patent application No. 2,235,088 to Madison, U.S. Pat. No. 5,568,207 to Chao, Canadian patent No. 2,223,295 to Chao, German patent application No. DE 43 16 698 to Karp, PCT application No. WO 026718 to Zelman, Canadian patent application No. 2,235,917 to Chao, U.S. Pat. No. 6,053,611 to Ku, U.S. Pat. No. 5,642,177 to Nishioka, PCT application no. WO 9009611 to Stemme, and U.S. Pat. No. 6,053,611 to Ku. International patent publication no. WO90/09611 to Stemme also teaches auxiliary glasses with a magnet located on the auxiliary bridge which extends backwardly to the primary bridge, which is also equipped with a magnet corresponding to the auxiliary magnet.

The insertion of magnets into such small items is difficult and costly. Also, there are several other drawbacks associated with the use of magnets in eyeglasses. As the strength of the magnets weakens, the security of attachment will become ineffective.

U.S. Pat. No. 6,341,864 to the present inventor, Ng, teaches a magnet-free method of attaching auxiliary lenses that provides for clips at various places around the outer perimeter of the auxiliary lenses. The clips engage the primary spectacles.

U.S. patent application Ser. No. 09/699,391 filed Oct. 31, 2000 by the present inventor, Ng, teaches an auxiliary spectacle apparatus wherein auxiliary lenses have a mechanical fastener on the bridge for releasably engaging the bridge portion of the primary frames in a manner which provides security of attachment in all directions. U.S. Pat. No. 6,264,323 to Chao also teaches an auxiliary spectacle wherein auxiliary lenses have a mechanical fastener on the bridge for releasably engaging the bridge portion of the primary frames.

U.S. Pat. No. 5,428,407 to Sheffield teaches a prescription lens attachable to a safety glass frame. The safety glass frame is provided with a center cross pin and indentation on an inner surface of the safety glass frame. A prescription frame configured to be attached to the inside of the safety frame includes separate prescription lenses and a central clip that clips onto the cross pin of the safety glass frame. The outer ends of the prescription frame are provided with angular locking ends that are pressed into the indentation on the safety glass frame. Thus, the prescription lens frame is held onto the safety glass frame between the safety glass frame and the person's eyes. However, this configuration requires that special prescription glasses must be prepared, which glasses can not be used without the special safety glasses.

It would be desirable to have an auxiliary eye protection apparatus which attaches to primary spectacles and which did not rely on magnets, and did not require an auxiliary bridge. Such a system should allow for the auxiliary eye protection to extend over and around the primary lenses, the primary frames, and the primary bridge.

SUMMARY OF THE INVENTION

The present invention provides a spectacle apparatus, comprising: (a) a visor adapted for fitting on a primary spectacle, said visor having a central portion corresponding in location to a bridge on said primary spectacle; (b) a projection extending reward from said central portion of said visor, said projection configured to have an interference fit with said bridge on said primary spectacle; and (c) a protrusion extending from said projection, said protrusion configured to have an interference fit with said bridge on said primary spectacle, said protrusion and said projection configured to be releasably received by said bridge on said primary spectacle; wherein said visor is configured to extend laterally beyond said primary spectacles.

In one embodiment the visor is configured to extend rearward around said primary spectacles.

In another embodiment the visor further comprises a malleable border. The malleable border may be located at an edge of said central portion of said visor.

The invention may further comprise a second projection, said second projection configured to have an interference fit with said bridge on said primary spectacle. The projection and said second projection may be configured to have an interference fit with said bridge on said primary spectacle at respectively opposite sides of said bridge. The respectively opposite sides of said bridge may be located at top and bottom of said bridge. In another embodiment, the respectively opposite sides of said bridge are located at left and right of said a vertical member located on said bridge. The second projection may have a second protrusion extending from said second projection, said second protrusion configured to have an interference fit with said bridge on said primary spectacle. The projection and said second projection may comprise a plurality of projections and a pair of second projections, each arranged in parallel.

The projection may be elastic. The projection may be formed integrally with said visor.

In another embodiment, the invention comprises: (a) a visor adapted for fitting on a primary spectacle, said visor having a central portion corresponding in location to a bridge on said primary spectacle; (b) a projection extending reward from said central portion of said visor, said projection configured to have an interference fit with said bridge on said primary spectacle; (c) a protrusion extending from said projection, said protrusion configured to have an interference fit with said bridge on said primary spectacle, said protrusion and said projection are configured to be releasably received by said bridge on said primary spectacle; and (d) a malleable border on an edge of said visor.

BRIEF DESCRIPTION OF THE DRAWINGS

A preferred embodiment of the invention will be described with reference to the accompanying drawings, in which.

DETAILED DESCRIPTION OF EMBODIMENTS

Preferred embodiments of the present invention will now be described in detail with reference to the appended drawings, in which like elements are denoted by like reference numerals.

Figure 1:
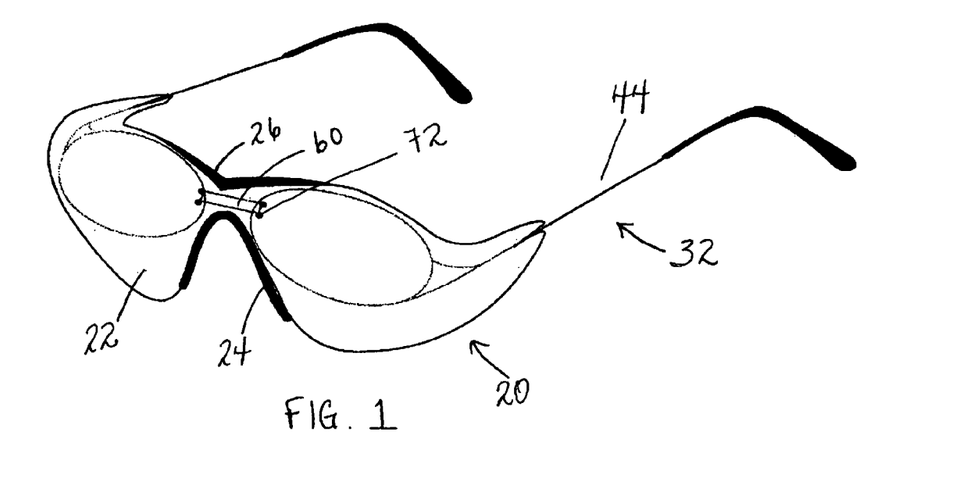
FIG. 1 is a three quarter view of an assembled primary spectacle and visor according to the present invention.
Figure 2:
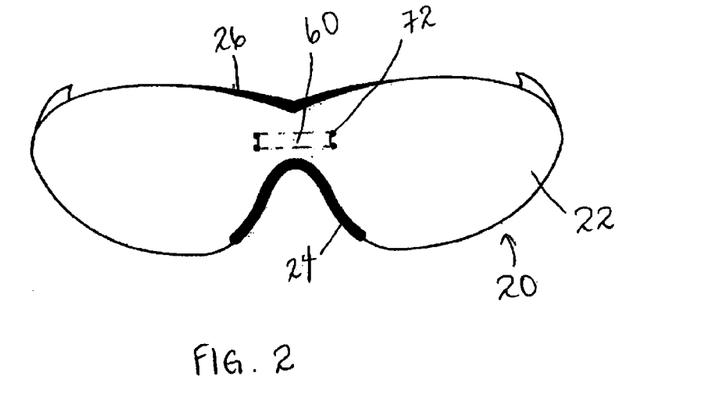
FIG. 2 is a front view of a visor according to the present invention.

As shown in FIG. 1, the spectacle apparatus of the present invention has an visor 20 for releasably attaching to a primary spectacle 32. FIG. 1 shows the apparatus in an assembled form. FIG. 2 shows a front view of a visor 20 alone. Visor 20 comprises a visor body 22 which is a transparent, semi-transparent or translucent material. Visor 20 has a clip mechanism 60 which is secured to the rear of the visor 20 by means of rivets 72. Generally either 2 or 4 rivets will be used to secure the clip mechanism 60 to the visor body 22.

The visor 20 shown in FIGS. 1 and 2 also has a lower border 24 and an upper border 26. The borders may be made of a soft, pliable material to provide protection of the wearer's face in the event that the visor is accidentally pushed against the face of the visor wearer. The border can be made of foam rubber or the like. This is particularly useful where the visor is worn to protect the wearer, for example, during sports or work activities. Alternately, the borders could be provided merely for esthetic purposes, for example, to add color to the visor.

Figure 3:
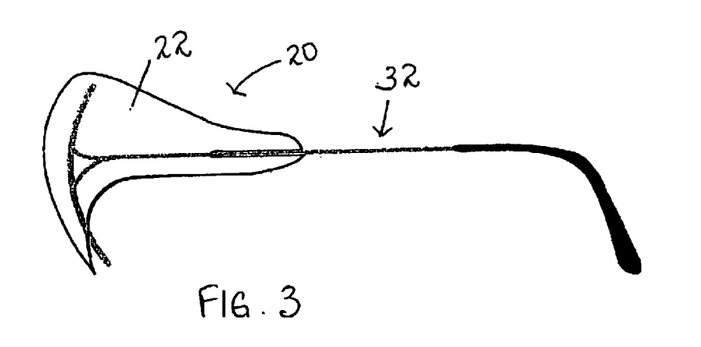
FIG. 3 is a side view of a visor according to the present invention.

As shown in FIGS. 1 and 3, the primary spectacle 32 is configured to be worn on the head of the wearer by means of the stems 44, which fit over a wearer ears to support the spectacles. Primary spectacle 32 includes a primary bridge 34 which may optionally have indentations 40. In the embodiment shown, two indentations 40 are present, one at the top and one at the bottom of the ridge. The primary bridge 34 and indentation 40 are configured to releasably engage with the clip mechanism 60.

Figure 4:
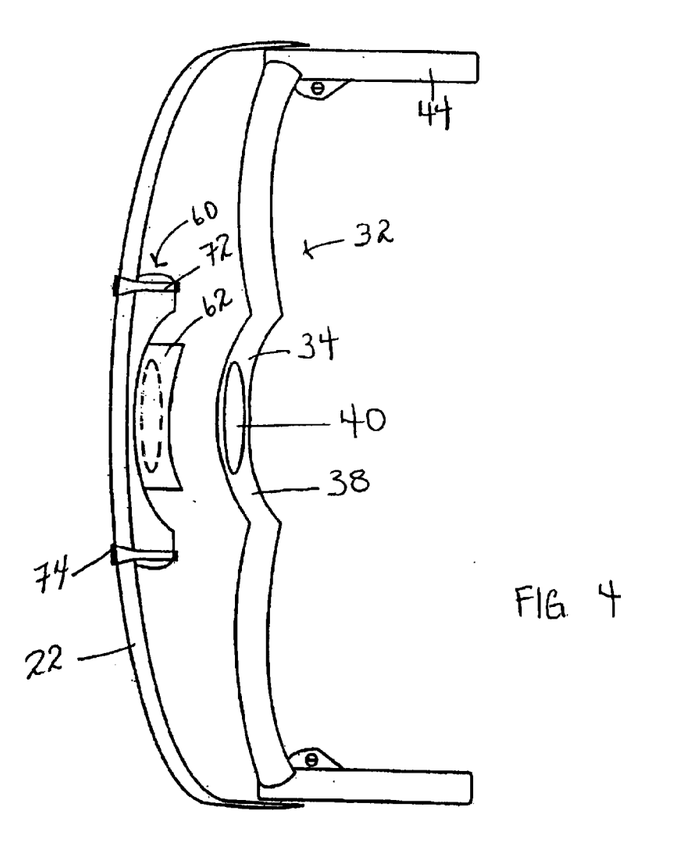
FIG. 4 is a top view of disassembled visor and primary spectacles according to the present invention.
Figure 5:
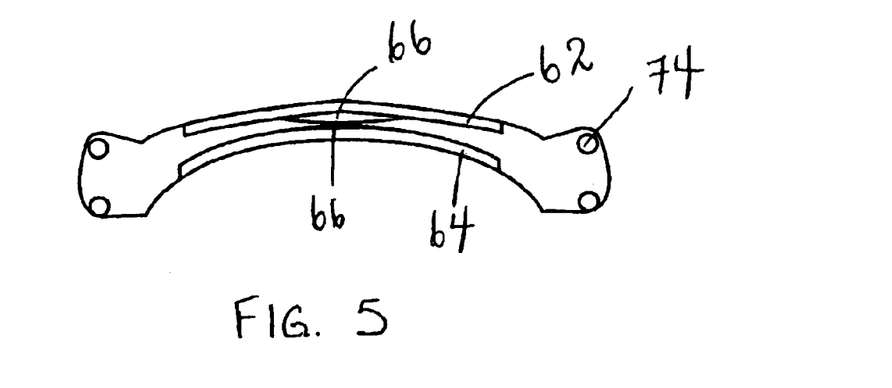
FIG. 5 is a rear view of a clip on mechanism according to the present invention.
Figure 6:
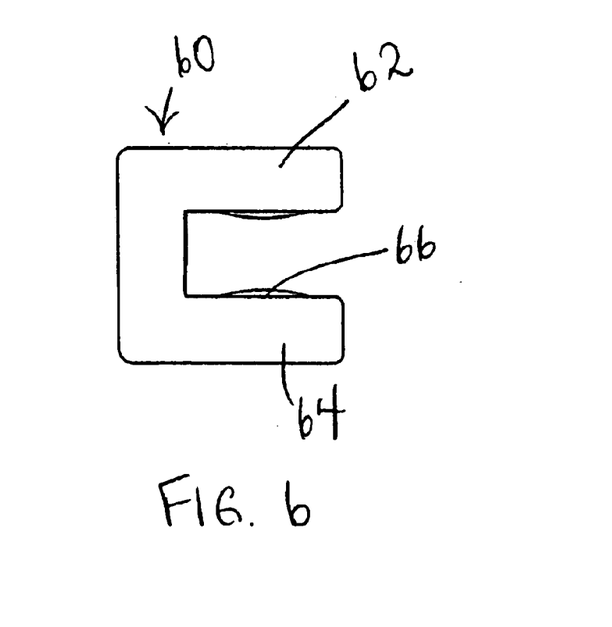
FIG. 6 is a side view of FIG. 5.

As shown in FIGS. 4, 5 and 6, the clip mechanism 60 has an upper projection 62 and a lower projection 64. Projections 62 and 64 have a protrusion 66 which is configured to releasably fit into indentation 40. In the embodiment shown, two protrusions 66 are present, one at the top and one at the bottom of the ridge. In other embodiments, the protrusions could be configured to extend over and behind the primary bridge, as discussed below.

Turning to FIG. 4, eyeglasses 32 includes a primary bridge 34 which is medial within the frame and which extends between and connects primary lenses. The primary spectacle 32 provides retaining structure for primary lenses. Primary lenses may be clear or slightly tinted glass or plastic material. One or both primary lenses may be shaped to the wearer's visual deficiencies.

Visor 20 is configured to cover both of the primary lenses. The shape and size of the visor 20 is configured to cover and extend beyond the eyeglasses 32. One use for the visor 20 is to provide protection to the wearer from sunlight and other vision-damaging elements. Therefore, the visor 20 may be tinted, and may also include a material therein or a coating thereon to filter ultraviolet light or other specific wavelengths of light.

Visor 20 comprises a clip mechanism 60 which provides a retaining means for visor 20. As shown in the embodiment of FIG. 4, clip mechanism 60 has clip rivets 72 which terminate in end 74. When assembled, clip rivets 72 extend horizontally through holes in lenses 50. End 74 provides security of attachment of visor body 20 to clip mechanism 60. End 74 may be present during assembly of lenses 50 to clip mechanism 60, or it may be formed or partially deformed upon assembly to increase the security of attachment.

Clip mechanism 60 may be made of any flexible material with a plastic memory. In embodiments of the invention, clip mechanism 60 is made with Polyflex™ (Hyundai Optical Co., Inchon City, Korea) or memory plastic. Memory plastic and Polyflex™ are lightweight plastics that can be bent or stretched without losing their original shape. Polyflex™ is particularly resilient in this regard. By use of such materials, the clipping apparatus between the clip mechanism 60 and primary bridge 34 may be used repeatedly without any deformation of shape or degradation of security of attachment. Such materials are also particularly suitable for the mechanical assembly of clip mechanism 60 and visor 20.

Upon assembly of clip mechanism 60 and visor body 22, lens rivet 72 is inserted through a hole 52 in each lens. By the use of Polyflex or memory plastic, this insertion may be carried out without risk of damage to the lenses. End 74 of FIG. 4 is configured such that it is greater in diameter than its corresponding hole when not deformed. The use of such materials also allows for the insertion of end 74 through the corresponding hole, by temporary deformation of end 74. Upon being inserted through the hole, end 74 reestablishes, by plastic memory, its original diameter, thus securing lens 50 to clip mechanism 60, in an interference fit. The security of attachment may be increased by treating end 74 with a glue or other fixative after assembly, or by treating end 74 to compression forces which are great enough to permanently deform end 74, partially spreading it against the rear surface or lens 50 immediately around hole 52.

In another embodiment, upon assembly of clip mechanism 60 and visor body 22, lens rivet 72 is inserted through its hole and secured with a cap. The security of attachment may be increased by treating the cap with a glue, cement, or other fixative during assembly, or by treating the cap to compression forces which are great enough to deform end 74, spreading it outwards within the orifices.

Figure 7:
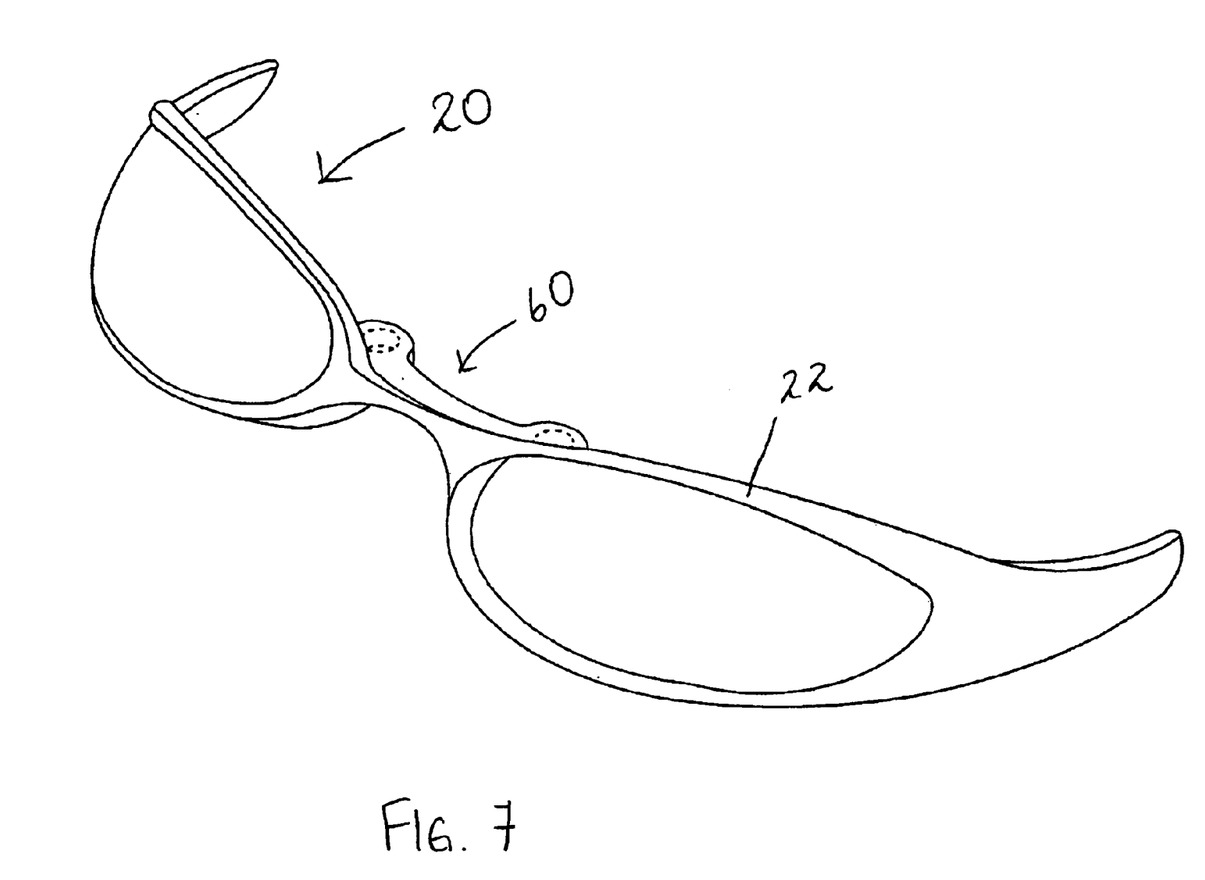
FIG. 7 is a three quarter view of an alternative embodiment of a visor according to the present invention.
Figure 8:
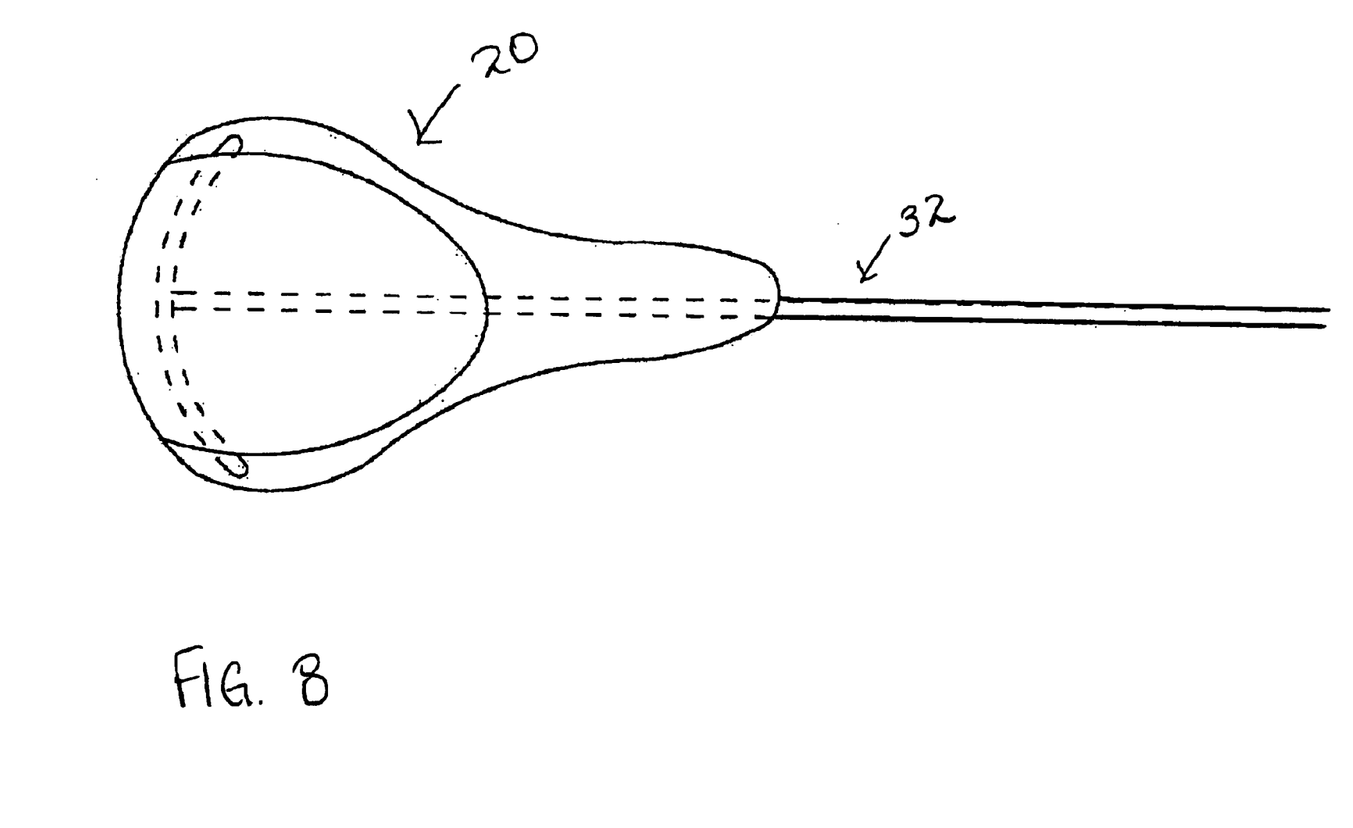
FIG. 8 is a side view of the embodiment of FIG. 7 relative to the location of primary spectacles.
Figure 9:
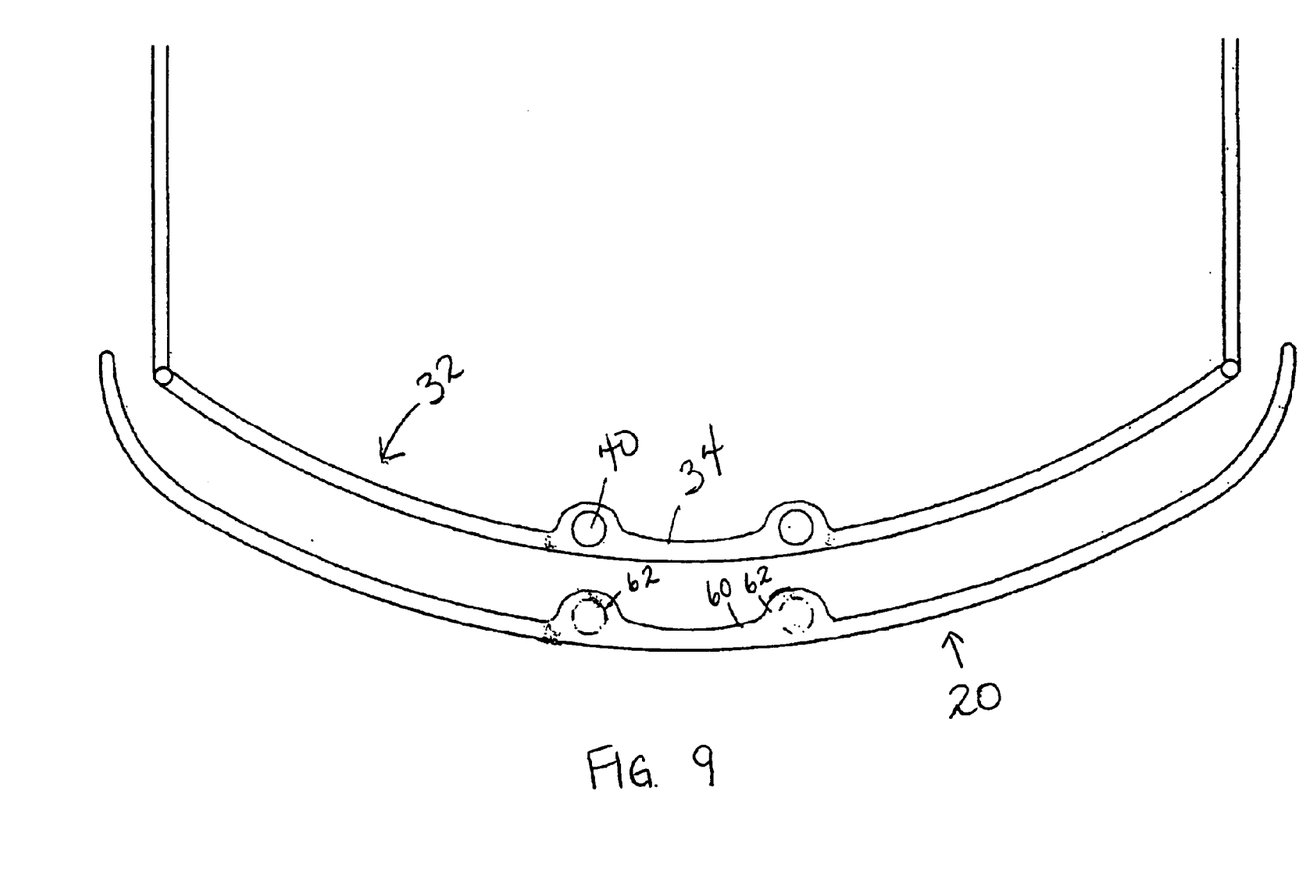
FIG. 9 is a top view of a disassembled visor and primary spectacle of FIG. 7.

FIGS. 7 to 9 show another embodiment of the visor of the invention. In this embodiment, a clip mechanism 60 is continuously formed with visor body 22 of visor. Thus, no rivets or other attachment means are necessary to secure the visor 20 to primary eyeglasses 32. As seen in FIG. 9, the embodiment shown in these figures has a pair of projections 62 which are received by primary bridge 34.

As best seen in FIG. 4, primary bridge 34 has a ridge front face 38 which forms a tight fit with clip mechanism 60 when the auxiliary bridge is assembled with the primary spectacles. This tight fit prevents rotation of the bridge off its vertical axis, thus preventing rattling, particularly when the assembled apparatus of the invention is being used by a wearer during vigorous activity.

Also seen in FIG. 4, ridge front face 38 extends parallel, and forms a tight fit with clip mechanism 60 which also extends parallel, when the auxiliary bridge is assembled with the primary spectacles. Again, this tight fit prevents rotation of the bridge off its vertical axis, thus preventing rattling.

Figure 11:
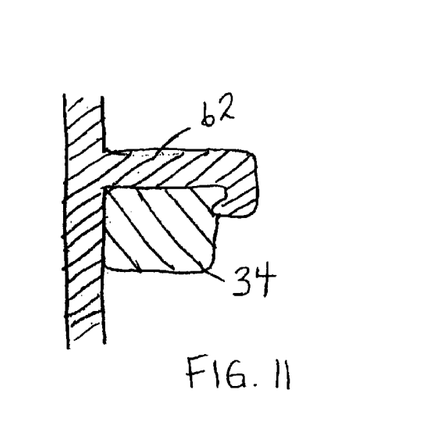
FIG. 11 is a vertical cut away view of a further alternative clip on mechanism according to the present invention.
Figure 12:
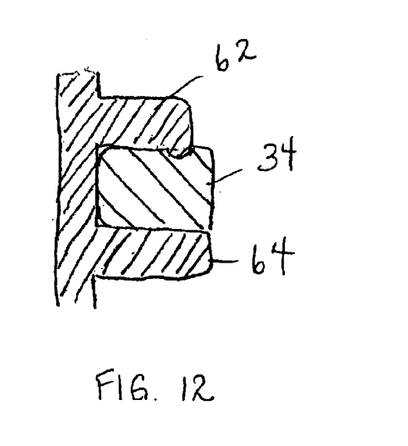
FIG. 12 is a vertical cut away view of a further alternative clip on mechanism according to the present invention.
Figure 13:
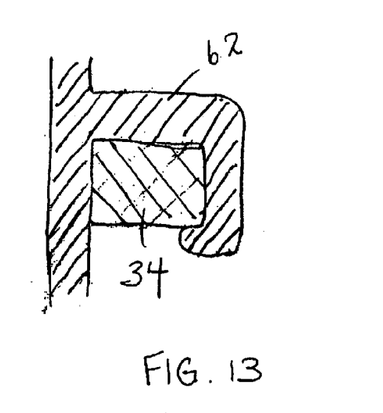
FIG. 13 is a vertical cut away view of a further alternative clip on mechanism according to the present invention.

As best seen in FIGS. 11, 12 and 13, primary bridge 34 has a ridge various faces 38 which forms a tight fit with clip mechanism 60 when the bridge is assembled with the visor 20. This tight fit prevents rotation of the bridge off its horizontal axis, thus preventing rattling. As best seen in FIG. 4, a curvature exists in the shape of primary bridge 34 which corresponds to a curvature in the shape of clip mechanism 60. When assembled, these corresponding curvatures form a tight fit which further prevents rotation of the bridge off its horizontal axis.

Figure 10:
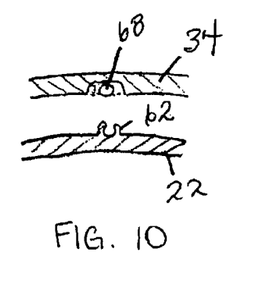
FIG. 10 is a horizontal cut away view of an alternative clip on mechanism according to the present invention.

In another embodiment, as shown in FIG. 10, the projections 62 and 64 may be opposite each other on a horizontal plane (i.e. right and left, rather than upper and lower). In this embodiment, primary bridge 34 has a post 68 which is configured to receive the projections for securing the visor to the primary eyeglasses.

By using the multiple interference fits described herein between the auxiliary and primary bridges, auxiliary spectacles 20 are less likely to collide with primary lenses during physical activity. This prevents an annoying rattling noise between the auxiliary spectacles 20 and primary spectacles 42 and also reduces the risk of scratching or otherwise damaging the lenses by reducing contact between primary lenses and auxiliary spectacles 20. The risk of accidental detachment of the auxiliary spectacles is also greatly reduced. A bump or collision which dislodges other, known apparatus will not give rise to the present auxiliary spectacles detaching from the primary spectacles, because of the multiple interference fits described herein.

When the fastening apparatus of the invention is engaged, visor body 22 are located proximal to primary lenses, so that a minimum amount of light or debris may enter the between the respective lenses.

Because projections 62, 64 project away from visor 20, and primary bridge 34 project outwardly from the eyeglasses 32, no recesses are required in the frames, which would weaken the frames. Furthermore, by avoiding the use of recesses in the fastening apparatus, one is provided with an auxiliary spectacle which can be easily removed and replaced on the primary spectacles, without any flexing or bending of the frames or bridges and without engaging auxiliary spectacle 20 at difficult angles in relation to primary spectacle 32.

In the embodiment as shown in FIG. 5 and FIG. 6, protrusions 66 are beveled. Beveling the protrusions facilitates the ease of attaching and removing the auxiliary spectacles from the primary spectacles.

In the embodiment shown, the lateral shape of projections 62 and 64 and corresponding lateral shape of primary bridge 34 prevents horizontal movement of the assembled apparatus. However, in another embodiments shown in FIGS. 7 and 9, horizontal movement could be prevented by supplying two of each of upper and lower protrusions set laterally apart and corresponding to primary bridge 34.

As best seen in FIG. 4, primary bridge 34 has at least one indentation 40 on primary bridge 34. Indentations 40 can be located at the top and bottom of primary bridge 34. In other embodiments, only one indentation 40 may be present. In a further embodiment, a single indentation 40 may comprise a hole extending vertically through primary bridge 34.

It will thus be appreciated that the present invention provides a secure method of attaching a sport or safety visor to primary spectacles without sacrificing the ease with which one can remove and replace the safety visor, and without having to remove the primary eyeglasses. Removal and replacement can be done with one hand, without the use of awkward angles of engagement and disengagement.

The use of a mechanical means of securing attachment, as opposed to a magnetic means, provides significant benefits. First, in producing the apparatus, the auxiliary bridge and the primary frame may be cast from a desired material, and is then ready for assembly. No drilling or puncturing is required to produce holes for insertion of magnets. No magnets or other additional pieces are required, and no fixative is required to install the means for securing attachment. As the apparatus for securing attachment of the present invention is a "unibody" design, the apparatus will not become loose or fall out with the passage of time and the weathering effect of changes in temperature and humidity.

Another benefit of the present visor is that no lens frames or bridge are required for the visor, thus decreasing the weight of the auxiliary spectacles and decreasing the cost of producing the auxiliary spectacles.

The above-detailed description with reference to the illustrations is considered to be illustrative and not restrictive in character. Modifications and variations on the embodiments described may be made within the scope of the invention. For example, the visor body 22 may also be used for magnification of vision. In this case, the visor body 22 would be fashioned in the same manner as a magnifying glass and fit onto the primary lenses, which may or may not be prescription lenses. The visor 20 would then enlarge small or intricate details to make them more readily observable, so as to reduce the strain on the eyesight of the wearer. The visor 20 may also have decorations thereon to be viewed by observers of the wearer, to enhance the appearance of the lenses or for amusement purposes.

In another embodiment, the present invention also contemplates primary spectacles 42 which contain no primary lens 18. This embodiment would be useful in the circumstances wherein the user desires to remove and replace the visor body 22, but does not require the primary lenses for assisting vision. For example, this embodiment would be useful in the context of welding, wherein very dark lenses are required during the welding, but between welding, it may be desirable to have no lenses on. As another example, where an individual suffers from a visual defect which makes reading difficult, it may be desirable to have no lenses except when reading.

It is to be understood that only the preferred embodiments have been shown, and that modifications thereof would be readily apparent to one skilled in the art. Therefore, the true scope and spirit of the invention resides in the appended claims and their legal equivalents, rather than by the given examples.

I claim:

1. A spectacle apparatus, comprising:
   (a) one visor adapted for fitting on a primary spectacle, said visor having a central portion corresponding in location to a bridge on said primary spectacle;
   (b) a projection extending reward from said central portion of said visor, said projection configured to have an interference fit with said bridge on said primary spectacle; and
   (c) a protrusion extending from said projection, said protrusion configured to have an interference fit with said bridge on said primary spectacle, said protrusion and said projection configured to be releasably received by said bridge on said primary spectacle;

wherein said visor is configured to extend laterally beyond said primary spectacles.

2. A spectacle apparatus as claimed in claim 1, wherein said visor is configured to extend rearward around said primary spectacles.

3. A spectacle apparatus as claimed in claim 1, wherein said visor further comprises a malleable border.

4. A spectacle apparatus as claimed in claim 3, wherein said malleable border is located at an edge of said central portion of said visor.

5. A spectacle apparatus as claimed in claim 1, further comprising a second projection, said second projection configured to have an interference fit with said bridge on said primary spectacle.

6. A spectacle apparatus as claimed in claim 5, wherein said projection and said second projection are configured to have an interference fit with said bridge on said primary spectacle at respectively opposite sides of said bridge.

7. A spectacle apparatus as claimed in claim 6, wherein said respectively opposite sides of said bridge are located at top and bottom of said bridge.

8. A spectacle apparatus as claimed in claim 6, wherein said respectively opposite sides of said bridge are located at left and right of said a vertical member located on said bridge.

9. A spectacle apparatus as claimed in claim 5, wherein said second projection has a second protrusion extending from said second projection, said second protrusion configured to have an interference fit with said bridge on said primary spectacle.

10. A spectacle apparatus as claimed in claim 5, wherein said projection and said second projection comprise a pair of projections and a pair of second projections, each arranged in parallel.

11. A spectacle apparatus as claimed in claim 1, wherein said projection is elastic.

12. A spectacle apparatus as claimed in claim 1, wherein said projection is formed integrally with said visor.

13. A spectacle apparatus, comprising:

(a) one visor adapted for fitting on a primary spectacle, said visor having a central portion corresponding in location to a bridge on said primary spectacle;

(b) a projection extending reward from said central portion of said visor, said projection configured to have an interference fit with said bridge on said primary spectacle;

(c) a protrusion extending from said projection, said protrusion configured to have an interference fit with said bridge on said primary spectacle, said protrusion and said projection are configured to be releasably received by said bridge on said primary spectacle; and (d) a malleable border on an edge of said visor.

14. A spectacle apparatus as claimed in claim 13, wherein said malleable border is located at an edge of said central portion of said visor.

15. A spectacle apparatus as claimed in claim 13, wherein said visor is configured to extend laterally beyond said primary spectacles.

16. A spectacle apparatus as claimed in claim 15, wherein said visor is configured to extend rearward around said primary spectacles.

17. A spectacle apparatus as claimed in claim 13, further comprising a second projection, said second projection configured to have an interference fit with said bridge on said primary spectacle.

18. A spectacle apparatus as claimed in claim 17, wherein said projection and said second projection are configured to have an interference fit with said bridge on said primary spectacle at respectively opposite sides of said bridge.

19. A spectacle apparatus as claimed in claim 17, wherein said projection and said second projection comprise a pair of projections and a pair of second projections, each arranged in parallel.

20. A spectacle apparatus as claimed in claim 13, wherein said projection is formed integrally with said visor.

* * * * *